3,212,219
METHOD OF FABRICATING ABRASIVE LEAVES
William G. Gillett, Los Angeles, Calif., assignor to Merit Products, Inc., Los Angeles, Calif., a corporation of California
Filed Jan. 17, 1962, Ser. No. 166,894
5 Claims. (Cl. 51—337)

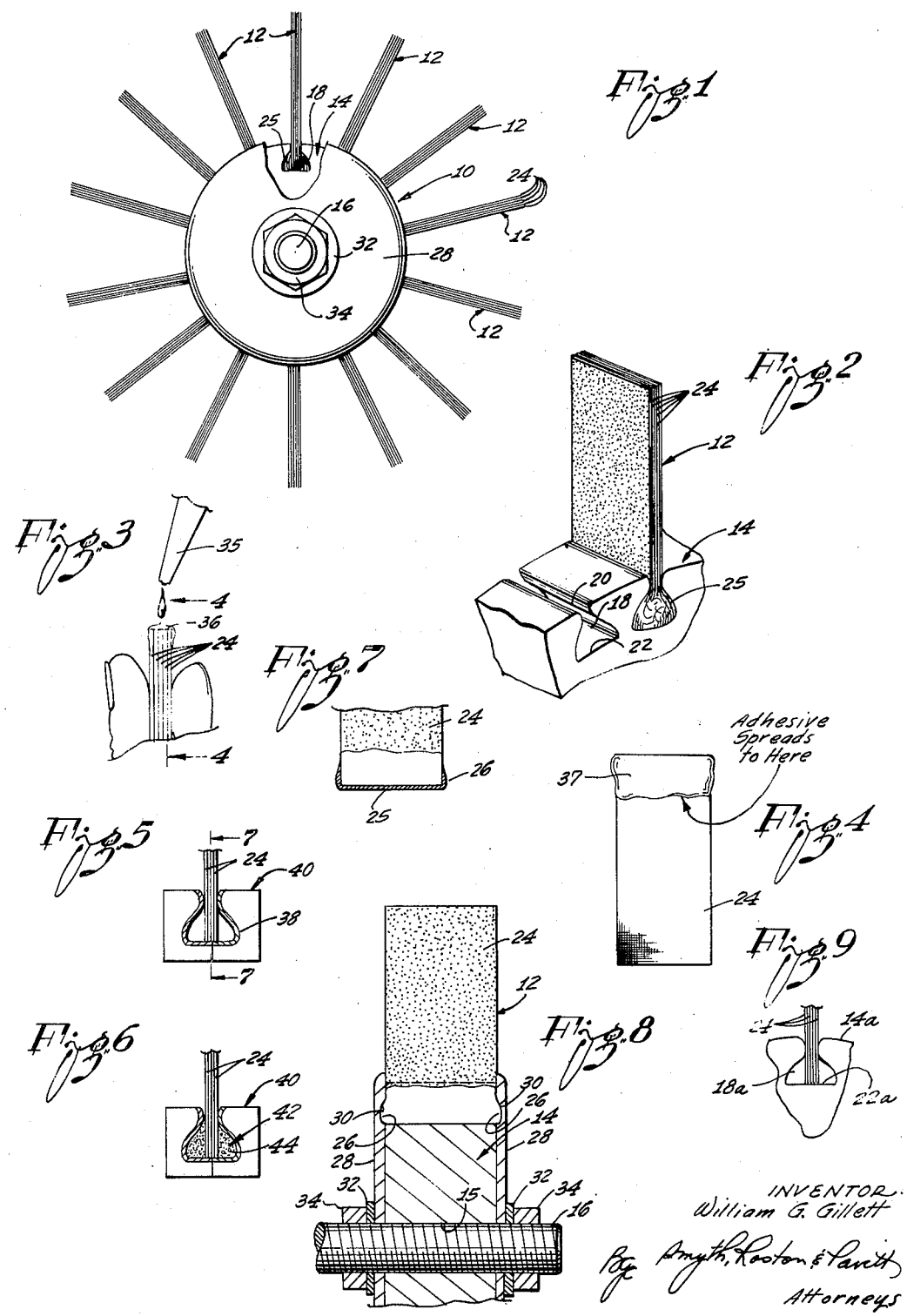

This invention relates to a flap-type abrasive wheel comprising packs of flexible abrasive leaves mounted endwise in spaced undercut slots in the periphery of a rotary hub structure. The invention is specifically directed to the structure and method of fabricating such a pack. With the slots of the hub structure undercut to form restricted necks, the problem is to provide the pack of abrasive leaves with an end enlargement of a configuration to fit into an undercut slot in interlocking engagement therewith.

One solution to this problem has been to insert a spacer into the end of a pack of leaves transversely thereof for expanding the thickness of the pack to provide the end enlargement for the pack, the ends of the leaves being bonded to the spacer. One disadvantage of this solution is in the cost of the spacer. Another disadvantage is the time required in the fabrication procedure for installing the spacer in the end of the pack.

The present invention is based on the concept of adhesively bonding the flexible abrasive leaves together at one end of the pack and of forming a molded enlargement on the exterior of the end of the pack with the molded enlargement fused with the inter-leaf adhesive material.

In the preferred practice of the invention, the material of the enlargement is of the same general character as the inter-leaf bonding material with resultant simplification of the fabrication procedure and both are cured simultaneously to insure integral fusing of the enlargement with the inter-leaf bonding material.

An important feature of the invention is the concept of using two different portions of plastic material of two different viscosities for the two different purposes of bonding the leaves together and of forming the end enlargement. In the preferred practice of the invention, epoxy resin is thinned with solvent to lower its viscosity and the resulting low viscosity resin is merely poured onto the end of a pack of the flexible leaves. Because of its low viscosity the epoxy readily spreads into the spaces between the leaves and it is a simple matter to control the extent to which the resin spreads between the leaves by simply controlling the quantity of resin that is poured onto the end of the pack.

While the applied resin is still fluid, the end of the pack is inserted into a mold cavity of substantially the size and configuration of an undercut slot on the hub structure. Additional epoxy resin is then poured into the mold to form the enlargement but this additional resin includes a suitable filler to give it relatively high viscosity.

Both of the successive applications of resin are then cured together.

The result is the formation of a single body of resin that both encases the end of the pack and bonds together the individual leaves of the pack. In the preferred practice of the invention a thin portion of the body of resin extends across the end of the pack and other portions bulge out at the two sides of the pack so that the ends of the individual abrasive leaves are completely encased by the resin body.

A further feature of one practice of the invention is that the bottoms of the undercut slots of the hub structure are substantially flat and the base ends of the pack are correspondingly flat. Heretofore the bottoms of the slots have been concavely rounded. If a pack of leaves of uniform length is backed snugly against a concavely rounded slot bottom, the outer end of the stack is correspondingly concavely rounded. Since it is objectionable to have the outer ends of the leaves of a pack concavely uneven, the end of the pack is not backed snugly against the concavely rounded bottom slot and consequently the enlarged end of the pack does not fit tightly in the slot. Forming the slots with flat bottoms, however, permits the anchoring ends of the pack to fit tightly in the slots with all of the outer ends of the leaves even with each other.

In another practice of the invention, the bottom of the slots are slightly convexly curved with the curvature concentric to the axes of rotation of the hub structure. With the leaves of a pack backed against the bottom of such a slot the outer end of the pack will be curved concentrically of the axis of rotation.

The features and advantages of the invention may be understood from the following detailed description and the accompanying drawing.

In the drawings, which is to be regarded as merely illustrative:

FIG. 1 is a side elevation, partly broken away illustrating a selected practice of the invention;

FIG. 2 is a fragmentary perspective view of a portion of the structure shown in FIG. 1;

FIG. 3 is an elevational view illustrating the first step in the preferred method of fabricating a replaceable abrasive unit for use in the hub structure shown in FIGS. 1 and 2;

FIG. 4 is a sectional view taken along the line 4—4 of FIG. 3 to show the extent of which the initially applied thin adhesive plastic material spreads by capillary action into the spaces between the successive leaves of the pack;

FIG. 5 is a sectional view illustrating the step of inserting a pack of leaves into a mold;

FIG. 6 is a similar view illustrating the next step of filling the mold cavity with a highly viscous plastic material.

FIG. 7 is a sectional view taken along the line 7—7 of FIG. 5 showing how the plastic enlargement encases the end of the pack of leaves and bulges slightly at each side of the pack;

FIG. 8 is a sectional view of the assembled abrasive wheel showing how the inner ends of the abrasive units are confined between two hub plates; and FIG. 9 is a fragmentary elevational view showing how the transverse peripheral slots of the hub structure of the abrasive wheel may have convexly curved bottom walls with the curvature concentric to the axis of rotation.

FIGS. 1, 2 and 8 embodying the presently preferred practice of the invention indicate the construction of a flap-type abrasive wheel which comprises a hub structure generally designated 10 and a peripheral series of replaceable abrasive units 12. The hub structure comprises a hub body 14 with an axial bore 15 to permit the hub body to be mounted on a powered shaft 16. As best shown in FIG. 2, the hub body 14 is provided with a circumferential series of transverse slots 18 each of which has overhanging side walls to form a narrow neck 20. The slots 18 preferably have substantially flat bottom walls 22 although other configurations including circular walls may also be used.

Each of the abrasive units 12 comprises a pack of individual abrasive leaves 24 with a base enlargement 25 united with the pack, the base enlargement being of the same cross sectional configuration as a slot 18 to permit the base enlargement to be inserted into a slot from one end thereof. In the construction shown, the base enlargement 25 of an abrasive unit 12 bulges slightly outward at each end of the slot as indicated at 26.

With all of the slots 18 occupied by abrasive units 12, the abrasive wheel is ready for operation since the base enlargements 25 are effective to anchor the abrasive units in opposition to centrifugal force. It is desirable, however, to provide a pair of hub plates 28 to cover the ends of the slots 18, the two hub plates having annular grooves 30 on their inner faces to receive the bulges 26 of the base enlargements 25. The two hub plates 28 are clamped against the hub body 14 in a well known manner by means of washers 32 and nuts 34.

The contemplated method of fabricating an abrasive unit 12 is illustrated by FIGS. 3–6.

The first step is to assemble a plurality of abrasive leaves 24 to make a pack of the desired thickness. The abrasive leaves 24 may, for example, be rectangular pieces of emery cloth or the like. It is contemplated that the thickness of a pack will be of substantially the thickness of the width of a neck 20 of slot 18, the number of leaves to make a pack depending not only on the width of the neck but also on the thickness of the individual leaves. For example the neck 20 of the slot 18 may form a gap ⅛" wide and if the leaves are 40 grit emery cloth, four leaves will fill the neck, whereas if the leaves are 400 grit emery cloth, as many as 20 leaves may be used to make a pack ⅛" thick.

After the leaves 24 are assembled to form a pack, the pack is held in the manner shown in FIG. 3, with one end of the pack uppermost. A container with a spout 35 is then employed to pour a small quantity of a suitable bonding material such as an epoxy resin 36 onto the upwardly presented end of the pack. The epoxy resin includes the usual catalyst and is relatively thin or of low viscosity to pentrate the spaces between the abrasive leaves 24 of the pack by capillary action. Since the extent to which the epoxy resin spreads over the areas between the successive leaves 24 depends on the quantity of epoxy that is poured onto the end of the pack, it has been found to be a simple matter to control the spread of the epoxy by simply controlling the amount of applied epoxy. Only a few trials are necessary to make an operator expert in this procedure. FIG. 4 shows how the quantity of the applied epoxy may be controlled to cause a limited portion 37 of the epoxy to spread over an end area of each leaf.

The next step is to insert the epoxy-treated end of the pack of abrasive leaves 24 into the cavity 38 of a suitable mold 40 as indicated in FIG. 5. The mold cavity 38 is of the same shape and dimension in cross section as a slot 18 in the hub body 14 and each end of the cavity is shaped to form the previously mentioned bulge 26 of a base enlargement 25. The next step indicated by FIG. 6 is to fill the mold cavity with a moldable material 42 of relatively high viscosity that is compatible with the first applied epoxy resin. For this purpose, epoxy resin with a catalyst may be again used, the epoxy resin containing filaments 44. Asbestos fibres are satisfactory for the filaments 44, but in the initial practice of the invention glass fibres have been used.

It is to be noted that the molding operation is performed while the initially applied epoxy resin between the leaves is still fluid. Consequently, the initially applied resin fuses integrally with the later applied epoxy that contains the glass fibres. Both of the two successive applications of epoxy resin are then cured together in a well known manner. With the thickened epoxy bulging at each end of the transverse base enlargement 25, each of the leaves 24 is completely encased at its inner end in cured epoxy and since the enlargement is molded to conform with the configuration of a slot 18, the enlargement fits snugly in the slot to unite the abrasive unit 12 effectively with the hub body 14.

FIG. 9 shows how the transverse slots 18a of a rotary hub structure 14a may be formed with bottom walls 22a that are of slight convex curvature, the bottom walls being curved cylindrically concentrically of the axis of rotation of the wheel. In an abrasive unit designed for mounting in a slot 18a, the inner end of the pack of leaves is of concave curvature to fit snugly the convex curvature of the bottom wall 22a and accordingly the outer ends of the packs are of convex curvature concentric to the axis of rotation. Thus, the outer end edges of the leaves of the replaceable unit conform to a circle that is concentric to the axis of rotation of the hub structure.

My description in specific detail of the selected embodiment of the invention will suggest various changes, substitutions and other departures from my disclosure within the spirit and scope of the appended claims.

I claim:

1. A method of fabricating a unitary pack of abrasive leaves with an enlargement at one end of the pack for anchoring the pack in a fixed undercut slot of a rotary hub structure, characterized by the steps of:

arranging a pluality of abrasive leaves in a pack;
applying a quantity of adhesive of low viscosity to the one end of the pack to spread by capillary action into the spaces between the leaves, with said quantity limited to control the spreading action to a predetermined region from the one end of the pack;
placing said one end of the pack in a mold of substantially the same configuration as the slot; and
applying a relatively viscous moldable material into said mold to mold on the one end of the pack an end enlargement bonded to said first applied adhesive and having a configuration corresponding to that of the slot.

2. A method as set forth in claim 1 in which
said adhesive is an epoxy resin and said moldable material is an epoxy resin with a filler added thereto to increase the viscosity of the resin.

3. A method as set forth in claim 1 wherein both said adhesive and said moldable material are a resin of the same character and wherein the method includes the step of curing the adhesive and the moldable material simultaneously.

4. A method of fabricating a unitary pack of abrasive leaves with an enlargement at one end of the pack for anchoring the pack in a fixed undercut slot of a rotary structure where the slot has a relatively narrow neck portion at a position near the outer circumference of the rotary hub structure and has an expanded portion at an interior position from the neck portion, characterized by the steps of:

arranging a plurality of abrasive leaves in a pack;
applying a quantity of adhesive material to the end of the pack to spread by capillary action into the spaces between the leaves at the one end of the pack, with said quantity of adhesive material limited to control the spreading action of the adhesive material to a predetermined region corresponding substantially to the portions of the leaves disposed within the slot;
placing said one end of the pack in a mold of substantially the same configuration as the slot; and
applying adhesive material into the mold to mold on the one end of the pack an end enlargement bonded to the leaves and having a configuration corresponding to that of the slot.

5. A method as set forth in claim 4 wherein the adhesive materials applied into the space between the leaves and into the mold are cured after the adhesive material has been applied into the mold.

References Cited by the Examiner

UNITED STATES PATENTS

| | | | |
|---|---|---|---|
| 951,432 | 3/10 | Bowditch | 15—192 |
| 953,277 | 3/10 | Marcus | 15—192 |
| 1,219,054 | 3/17 | Timmis | 15—192 |
| 1,685,406 | 9/28 | Kinman | 51—193.5 X |
| 2,763,105 | 9/56 | Feeley | 51—193 X |
| 2,842,902 | 7/58 | Miller | 51—193.5 |
| 2,871,632 | 2/59 | Cosmos | 51—193.5 |
| 3,053,021 | 9/62 | Block | 51—193.5 |

J. SPENCER OVERHOLSER, Primary Examiner.

FRANK E. BAILEY, Examiner.